Dec. 20, 1955  M. O. KILPATRICK  2,727,765
ROTARY MECHANICAL SEAL

Filed Jan. 2, 1952  2 Sheets-Sheet 1

INVENTOR.
MYRON O. KILPATRICK
BY
Hudson + Young
ATTORNEYS

Dec. 20, 1955  M. O. KILPATRICK  2,727,765
ROTARY MECHANICAL SEAL
Filed Jan. 2, 1952  2 Sheets-Sheet 2

*INVENTOR.*
MYRON O. KILPATRICK
BY
Hudson + Young
*ATTORNEYS*

United States Patent Office 2,727,765
Patented Dec. 20, 1955

2,727,765

ROTARY MECHANICAL SEAL

Myron O. Kilpatrick, Bartlesville, Okla., assignor to Phillips Petroleum Company, a corporation of Delaware Application January 2, 1952, Serial No. 264,427

6 Claims. (Cl. 286—11)

This invention relates to improved sealing means for a rotary shaft. In one aspect it relates to improved sealing means for a rotary shaft having a relatively large diameter and adapted to rotate at a high velocity. In another aspect it relates to the reduction of wear in a means for sealing a high speed rotary shaft against fluid leakage. In still another aspect it relates to an improved floating ring adapted to seal a rotary shaft against fluid leakage. In another aspect it relates to a lubricated floating ring sealing means. In a further aspect it relates to a floating ring sealing means adapted to rotate at a velocity different from the rotary velocity of the rotating shaft.

A rotary shaft adapted to rotate at a high speed presents a problem of prevention of fluid leakage, particularly when such a shaft is used in connection with blowers, compressors, turbines, pumps and reactors. The higher the speed of the shaft, the more acute is the problem of sealing against fluid leakage. Sealing means provided by the prior art for such rotary shafts have the disadvantage that they wear out quickly and the equipment must be frequently taken out of operation for replacement of said sealing means.

According to the present invention there is provided a means for sealing a rotating shaft which means permits a lower wear and improved sealing by causing or allowing a substantial reduction in the relative velocity of the sealing faces.

The invention comprises a floating ring adapted to bear against the sealing surfaces or faces connected with the shaft and related equipment and adapted to rotate at a velocity less than that of the rotating shaft. The floating ring can be provided with gear means which cause it to rotate at a predetermined velocity, which is less than that of the rotary shaft, and which is preferably twenty-five to seventy-five per cent, and more preferably fifty per cent, of the velocity of the rotary shaft. By the rotation of the floating ring at a velocity intermediate zero and the velocity of the rotating shaft, the relative velocities of the ring with respect to the stationary and the rotating sealing faces are held to a value less than the relative velocity between the fixed and rotating sealing faces and the wear of said faces is therefore decreased.

The rate of wear of the sealing surface of the ring and of the faces will increase with an increase in the relative velocity of said surfaces. Rate of wear would be substantially zero at zero relative velocity. In the present invention, two relative velocities must be considered: (1) the velocity of the sealing surface of the ring with respect to that of the stationary sealing surface, e. g., of the shaft housing; and (2) the velocity of the sealing surface of the ring with respect to that of the sealing face attached to the rotating shaft. A low relative velocity of the ring with respect to the shaft, and consequently a low rate of wear of the sealing surfaces of these members, is accompanied by a high relative velocity of the ring with repect to the housing and a correspondingly high rate of wear of the sealing surface of the ring and the adjacent sealing surface of the housing. Thus there is an optimum intermediate velocity of the ring which will correspond to an optimum rate of wear of both pairs of sealing surfaces. This optimum velocity is in the range of 25 to 75 per cent of the velocity of the shaft with respect to the housing. If the materials of the two pairs of sealing faces are different, one pair being of one material and the other of another material, the optimum velocity range of the ring will be different from that aforementioned and must be determined by trial in any given case.

The sealing surfaces can be lubricated to reduce wear further. Improved sealing can be effected by injecting a lubricant between the sealing surfaces at a positive pressure.

It is evident that the housing can rotate and the shaft remain stationary. This invention is applicable to such an arrangement.

Figure 1:
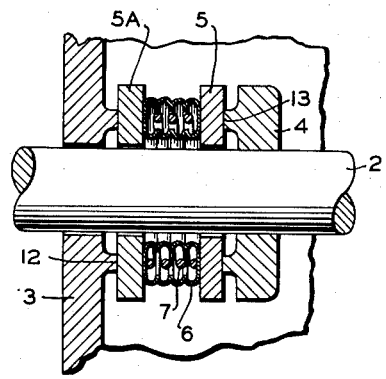
Figure 1 is a diagrammatic drawing of one embodiment of the invention.

According to Figure 1, rotary shaft 2, which extends through housing 3 is provided with collar 4, which is rigidly attached to shaft 2. Housing 3 is provided with sealing or wearing face 12, and collar 4 is provided with sealing face 13. Faces 12 and 13 can be of wear resistant material, and if desired, highly polished. Floating rings 5 and 5A are concentric with rotary shaft 2 but are not rigidly attached thereto, being free to rotate around the axis of shaft 2 and independently of shaft 2. Spring 7 in bellows 6 forces rings 5 and 5A against faces 12 and 13, thus sealing rotary shaft 2 against fluid leakage. Spring 7 can be so connected to rings 5 and 5A that the latter do not rotate with respect to each other. In this embodiment of the invention, floating rings 5 and 5A are free to rotate when shaft 2 rotates, but will rotate at a velocity different from that of shaft 2. The relative velocity of rings 5 and 5A with respect to face 12 is thus less than the relative velocity of face 13 with respect to face 12. Furthermore, the relative velocity of rings 5 and 5A with respect to face 13 is less than the relative velocity of face 13 with respect to face 12. Wear of the surfaces or faces 12 and 13 is thus decreased. Wear can be further decreased by injecting a suitable lubricant between rings 5 and 5A and faces 12 and 13 by means not shown.

Figure 2:
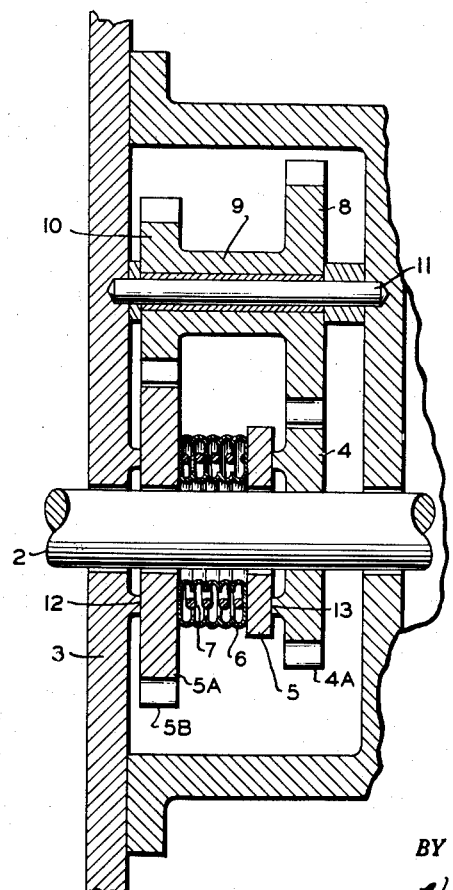
Figure 2 is a diagrammatic drawing of a second embodiment of the invention.

A second embodiment of the invention is shown in Figure 2. Rotary shaft 2, extending through housing 3, is provided with collar 4, which is rigidly attached to said shaft. Rings 5 and 5A are provided, as in Figure 1, and are made to bear against faces 12 and 13 by spring 7 in bellows 6. In this embodiment collar 4 is provided with gear teeth 4A and ring 5A is provided with gear teeth 5B. Gear 8, which rotates on shaft 11 engages the gear teeth of collar 4. Gear 10, which is mounted on common hub 9 with gear 8, engages the gear teeth of ring 5A. The relative diameters of the four gears are such that, by the action of the gear teeth of collar 4, gear 8, gear 10, and the gear teeth of ring 5A, ring 5A is rotated at a predetermined speed which is intermediate zero and the speed of rotary shaft 2 and in the same direction. It is preferred that this speed be twenty-five to seventy-five per cent of that of rotary shaft 2. It is further preferred that the rotary velocity of ring 5A be approximately fifty per cent of that of rotary shaft 2. The embodiment of Figure 2 differs from that of Figure 1 in that a definite and predetermined velocity of the sealing rings relative to the shaft velocity is maintained at all times.

Figure 3:
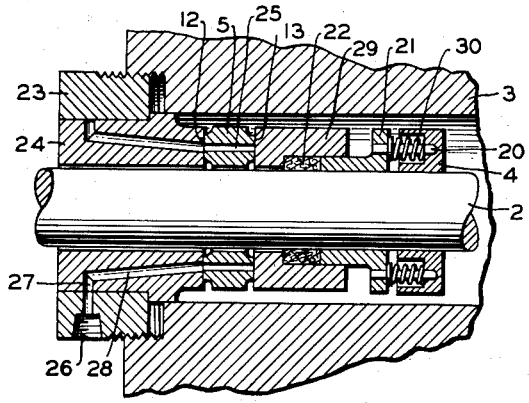
Figure 3 is a diagrammatic drawing of a third embodiment of the invention.

Figure 3 illustrates lubricating means in connection with a floating-ring sealing means. Shaft 2 extends through housing 3. Attached to shaft 2 is collar 4. Seal ring 29, having face 13, is held tightly on shaft 2 by means of packing 22, follower 21, and springs 30 on guides 20. Stationary collar 24 is held in housing 3 by means of nut 23. Floating ring 5 contacts sealing faces 12 and 13 and is freely rotatable about shaft 2. Floating ring 5 is provided with a plurality of oil passages 25 arranged equidistantly from the center of ring 5. Oil, under pressure, enters oil inlet 26 in nut 23, passes through groove 27 and passages 28 in collar 24. Part of the oil lubricates face 12, and the remainder passes through passages 25 in floating ring 5 and lubricates face 13. The number of passages 25 is sufficiently great that oil flows substantially continuously through passages 25 and lubricates face 13. It is evident that a plurality of rings 5 may be used.

Figure 4:
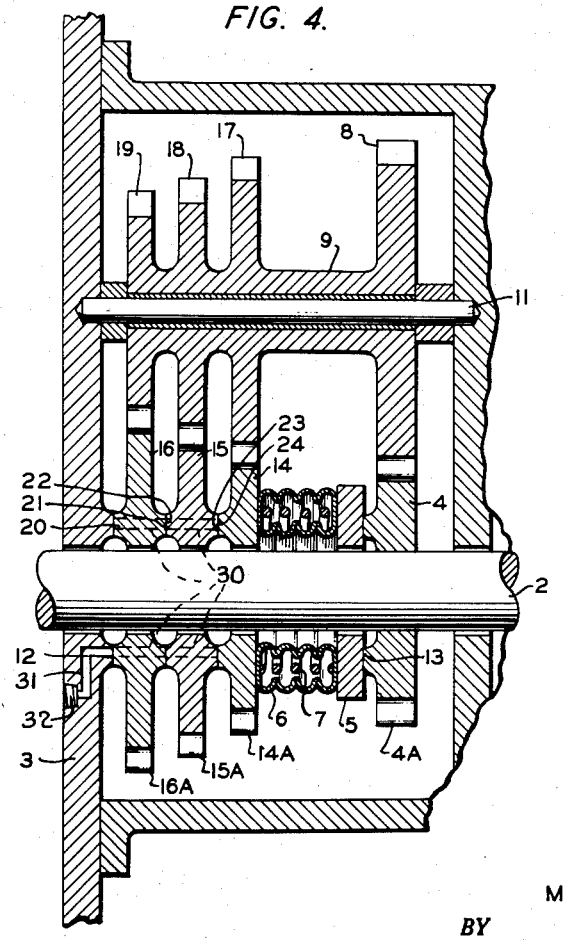
Figure 4 is a diagrammatic drawing of a fourth embodiment of the invention.

Figure 4 is an illustration of another embodiment of the invention, in which a plurality of geared rings is used. Rotary shaft 2 extends through housing 3. Geared collar 4 having gear teeth 4A is rigidly attached to shaft 2. Ungeared ring 5 bears against sealing face 13 of collar 4. Geared rings 14, 15, and 16 are rotatable with respect to shaft 2. These rings are provided with peripheral gear teeth 14A, 15A, and 16A, respectively. The rings are also provided with sealing faces 20, 21, 22, 23, and 24. Sealing face 24 of ring 14 bears against sealing face 23 of ring 15. Face 22 of ring 15 bears against face 21 of ring 16. Face 20 of ring 16 bears against sealing face 12 of housing 3. Bellows 6 is connected between rings 14 and 5. Spring means 7, within bellows 6, forces ring 5 against sealing face 13 of collar 4. It also forces the other rings in the opposite direction so that sealing face 24 bears against sealing face 23, face 22 against 21 and face 20 against face 12. Also provided are gears 8, 17, 18 and 19 mounted on axle 11 and provided with a common hub 9. Gear 8 engages the gear teeth of collar 4. Gear 17 engages the gear teeth of ring 14. Gear 18 engages the gear teeth of ring 15. Gear 19 engages the gear teeth of ring 16. The diameters of the gears, the geared rings and collar 4 are so related that rings 5, 14, 15, and 16 are rotated at velocity intermediate zero and the velocity of shaft 2 with respect to housing 3. The diameters can be so related that geared rings 14, 15, and 16 rotate at different velocities with respect to each other. In such an arrangement, ring 14 rotates at a velocity greater than that of ring 15, and velocity of ring 15 is greater than that of ring 16. The rotary velocity of each ring is intermediate zero and the relative velocity of shaft 2 with respect to housing 3. In this manner, the relative velocity of each sealing face with respect to the sealing face against which it bears is relatively low and the rate of wear is thus reduced. As previously mentioned, means may be provided for lubricating each sealing face in a manner similar to that shown in Figure 3. Thus, as shown in Figure 4, lubricant passages 30 are provided in rings 15 and 16. A plurality of these passages in each ring is provided for purposes of complete lubrication. The passages in each ring are adapted to register with or communicate with the passages in the other ring. The passages 30 in ring 16 are adapted to register and communicate with passage 31 in housing 3 which passage communicates with lubricant inlet 32. Lubricant under pressure is supplied from a suitable external source to inlet 32.

Variation and modification are possible within the scope of the foregoing disclosure and the appended calims to the invention the essence of which is a sealing means for a rotary shaft, said sealing means comprising a floating ring adapted to bear against sealing surfaces and adapted to rotate at a velocity intermediate zero and the velocity of the rotary shaft, and a method of reducing wear by rotating said floating ring at a velocity intermediate zero and the velocity of said shaft.

I claim:

1. In an apparatus comprising a rotatable shaft, a housing for said shaft, said housing having a sealing face thereon, and a collar fixedly attached to said shaft and having a sealing face thereon, sealing means comprising, in combination: at least three rings concentric with said shaft and rotatable about said shaft, all but one of said rings having peripheral gear teeth and one of the rings having gear teeth being positioned to bear sealingly against said sealing face on said housing, said ring without gear teeth being positioned to bear sealingly against said sealing face on said collar; a bellows attached to two of said rings and positioned therebetween; spring means within said bellows and adapted to force the ungeared ring against the sealing face on said collar and to force said rings having gear teeth sealingly against each other and toward the sealing face on said housing; gear teeth peripherally attached to said collar; an idler gear engaging the gear teeth of said collar; and at least two other idler gears which are rigidly attached to said first-mentioned idler gear, each being positioned to engage the gear teeth of one of the geared rings and adapted to rotate each geared ring at a velocity which is intermediate zero and the velocity of said shaft with respect to said housing and which is different from the velocity of each of the other geared rings.

2. In an apparatus comprising a rotatable shaft, a housing for said shaft, a sealing face integral with a collar centrally attached to said shaft, and a sealing face integral with said housing; sealing means comprising, in combination: at least three rings positioned around said shaft, concentric therewith and adapted to rotate freely about said shaft, all but one of said rings being geared; a bellows between two of said rings and connected to the two rings; spring means within said bellows and adapted to force two of said rings against sealing faces, the ungeared ring bearing against said sealing face which is integral with said collar; gear means integral with said collar; and intermediate gear means engaging said first-mentioned gear means and each of the geared rings and adapted to rotate each of said rings at a velocity which is less than the relative velocity of said shaft with respect to said housing and which is different from the velocity of each of the other geared rings.

3. In an apparatus comprising a rotatable shaft, a housing for said shaft, a collar having a sealing face attached thereto, said collar having gear teeth and being rigidly attached to said shaft, and a sealing face attached to said housing; improved sealing means comprising, in combination: at least three rings coaxial with said shaft and rotatable thereabout, one of said rings having no gear teeth and the other rings having gear teeth peripherally attached thereto; sealing faces on said rings having gear teeth, a sealing face on one of said rings being adapted to bear against the sealing face on said housing and the other sealing faces on said rings being adapted to bear against the sealing face of an adjacent ring; a bellows between and connected to said ring having no gear teeth and one of said rings having gear teeth; spring means within said bellows and adapted to force said ring having no gear teeth against the sealing face on said collar and to force the sealing face on one of said rings having gear teeth against the sealing face of the next adjacent ring; an intermediate gear means engaging the gear teeth of said collar and the gear teeth of said rings and adapted to rotate each of said rings having gear teeth at a velocity which is intermediate zero and the velocity of said shaft with respect to said housing and which is different from the velocity of each of the other geared rings.

4. An apparatus according to claim 3 having means for lubricating at least one of said sealing faces.

5. An apparatus according to claim 4 wherein said means for lubricating comprises lubricant passages extending through said rings having gear teeth and the sealing faces attached thereto, said passages being adapted to communicate with each other and with lubricant inlet means positioned in said housing.

6. In an apparatus comprising a rotatable shaft, a housing for said shaft, said housing having a sealing face, and a geared collar attached to said shaft and having a sealing face, improved sealing means comprising, in combination: at least three rings positioned around said shaft and adapted to rotate freely about said shaft, all but one of said rings being geared; a bellows between two of said rings and connected to the two rings; means for forcing two of said rings against said sealing faces; the ungeared ring bearing against the sealing face of said collar; an intermediate gear means engaging the geared collar and each of the geared rings and adapted to rotate each of said geared rings at a velocity which is less than the relative velocity of said shaft with respect to said housing and which is different from the velocity of each of the other geared rings.

References Cited in the file of this patent

UNITED STATES PATENTS

| | | |
|---|---|---|
| 849,576 | Schulz | Apr. 9, 1907 |
| 1,618,655 | Halvorsen | Feb. 22, 1927 |
| 2,042,691 | Williams | June 2, 1936 |
| 2,148,093 | Wheeler | Feb. 21, 1939 |
| 2,207,371 | Blackmore et al. | July 9, 1940 |
| 2,244,450 | Erni | June 3, 1941 |
| 2,258,008 | Hollatz | Oct. 7, 1941 |
| 2,277,771 | McNab | Mar. 31, 1942 |

FOREIGN PATENTS

| | | |
|---|---|---|
| 591,522 | Great Britain | of 1947 |